Aug. 21, 1923.  
C. A. FISK  
1,465,898  
NONPNEUMATIC TIRE  
Filed March 9, 1923

WITNESSES

INVENTOR
CARL A. FISK
BY
ATTORNEYS

Patented Aug. 21, 1923.

1,465,898

UNITED STATES PATENT OFFICE.

CARL ADOLF FISK, OF NEW YORK, N. Y.

NONPNEUMATIC TIRE.

Application filed March 9, 1923. Serial No. 624,012.

*To all whom it may concern:*

Be it known that I, CARL A. FISK, a citizen of the United States, and a resident of the city of New York, borough of the Bronx, in the county of Bronx and State of New York, have invented a new and Improved Nonpneumatic Tire, of which the following is a full, clear, and exact description.

This invention has relation to non-pneumatic tires for vehicles and has particular reference to a filler for a tire shoe or casing, the same being in the nature of an improvement over my prior application filed June 15, 1922, and bearing Serial No. 568,466.

The present invention contemplates for one of its objects an improved form of connection between the outer band of the filler element and the rim of the wheel which more efficiently functions to allow for the local compressions of the tire when encountering an obstacle or when supporting the weight of the vehicle.

As a further object the improved filler includes means for effecting impingement and close contact of the beads of the tire with the beads of the rim in order to prevent the entrance of water, moisture, sand, dirt, or other foreign matter to the interior of the casing.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1:
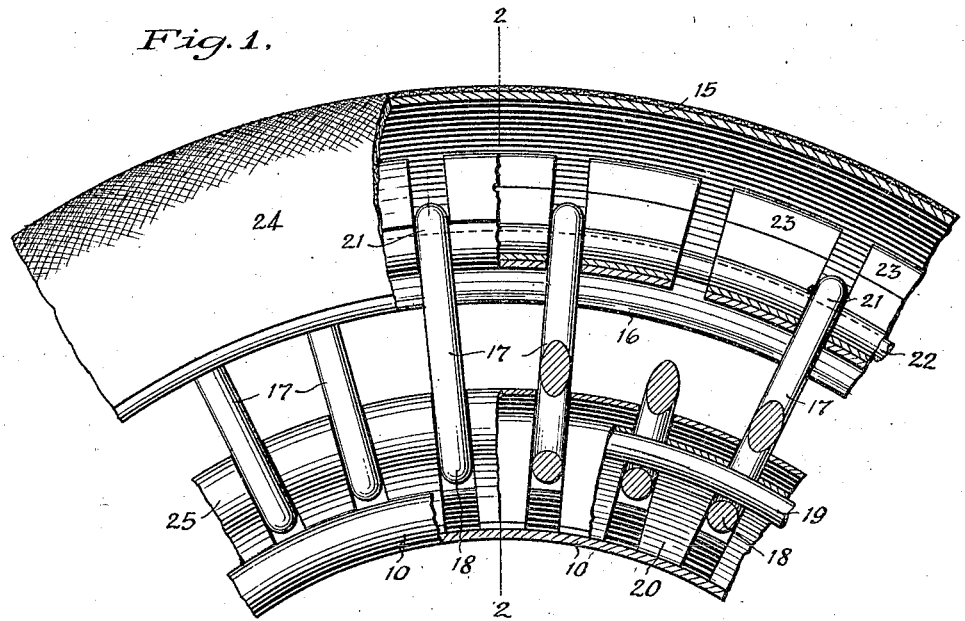
Figure 1 is a fragmentary side elevation of a vehicle rim equipped with the shoe or casing filler constructed in accordance with the invention, parts being broken away and shown in section to disclose the underlying structure.
Figure 2:
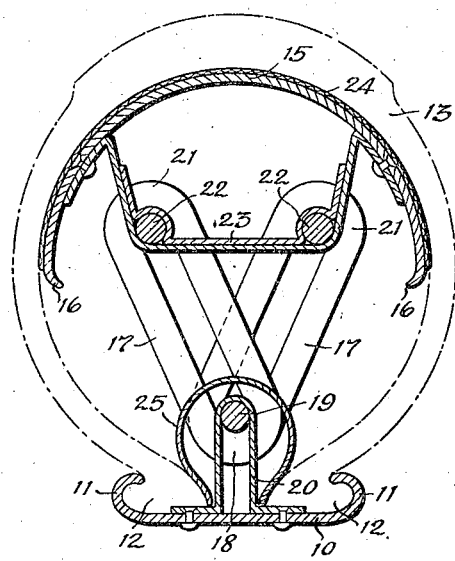
Fig. 2 is a transverse sectional view therethrough taken approximately on the line 2—2 and illustrating in broken lines the tire casing or shoe applied.

Referring to the drawing by characters of reference, 10 designates the rim of a vehicle wheel which may be of any approved construction and which is provided at its opposite side edges with flanges 11 which are designed to clinch or engage with the beads 12 of a tire shoe or casing 13. The rim may be of the demountable or attached type without in any way affecting the invention or functioning of the improved filler.

The tire filler which constitutes the invention and serves as a substitute for the usual inflated inner tube consists of an annular flexible metallic member 15 which is of substantially semi-circular configuration in cross section, the inner edges being turned inwardly as at 16 in order to eliminate the possibility of the sharpened edges or corners injuring the inner face of the tire shoe or casing. The member 15 is connected to and normally supported in concentric relation to the rim 10 by a plurality of elongated radially disposed links 17, the inner bights 18 of which embrace a common annular pivot rod 19 which is supported from the rim by circumferentially spaced radially disposed U-shaped bearing members 20 which project outwardly from the outer face of the rim 10. The outer bights 21 of each alternate link 17 embraces one of a pair of laterally spaced pivot rods 22 which pivot rods are supported from the inner face of the annular flexible member 15 by brackets 23 which radiate inwardly therefrom. Under this arrangement the links alternately project at opposite angles from the inner pivot rod 19. The bearing members 20 and bearing brackets 23 serve to uniformly space the inner and outer bights of the links from one another and eliminate any tendency of the band 15 to creep circumferentially relative to the rim 10. In order to eliminate friction and wear due to the contact of the metal band 15 with the inner tread surface of the shoe or casing, a covering layer 24 consisting preferably of canvas soaked in graphite is arranged over the outer face of the band 15. For the purpose of tightly impinging and engaging the beads 12 of the tire with the flanges 11 of the rim, a plurality of spring elements 25 are provided, the free extremities of which engage the inner sides of the beads and force the same outwardly thus eliminating the possibility of the entrance of moisture, sand, dirt or other foreign matter to the interior of the shoe or casing.

I claim:—

1. A non-pneumatic resilient filler for a tire shoe or casing comprising a resilient band conforming to and arranged within the tread portion of the tire shoe or casing, and a connection between said band and the tire shoe or casing supporting rim for normally maintaining the band in spaced concentric relation to the rim, said connection consisting of circumferentially spaced links having slidable and pivotal connection at their opposite ends respectively with the band and rim, said links being alternately disposed at an angle.

2. A non-pneumatic resilient filler for a tire shoe or casing comprising a resilient band conforming to and arranged within the tread portion of the tire shoe or casing, and a connection between said band and the tire shoe or casing supporting rim for normally maintaining the band in spaced concentric relation to the rim, said connection consisting of circumferentially spaced links having slidable and pivotal connection at their opposite ends respectively with the band and rim, said links being alternately disposed at an angle, and means interposed between the links for preventing circumferential swinging thereof and relative circumferential movement or creeping of the band with respect to the rim.

3. A non-pneumatic resilient filler for a tire shoe or casing comprising a resilient band conforming to and arranged within the tread portion of the tire shoe or casing, and a connection between said band and the tire shoe or casing supporting rim for normally maintaining the band in spaced concentric relation to the rim, said connection consisting of circumferentially spaced links having slidable and pivotal connection at their opposite ends respectively with the band and rim, said links being alternately disposed at an angle, means interposed between the links for preventing circumferential swinging thereof and relative circumferential movement or creeping of the band with respect to the rim, and means located adjacent the inner pivoted ends of the links for engaging and forcing the tire beads against the rim flanges.

4. The combination with the outer shoe or casing of a tire and a channeled supporting rim between which the beads are received, of a filler for resiliently maintaining the tread portion of the casing normally in concentrically spaced relation to the rim, said filler including a resilient band of a transverse configuration corresponding to the inner tread portion of the shoe or casing and arranged within said portion, a connection between said band and the rim comprising inwardly projecting bearing brackets on the band, parallel circumferential pivot rods carried by the bearing bracket, outwardly projecting bearing members secured to the rim, an annular pivot rod carried thereby, and links having their inner bights embracing the inner pivot rod, alternate links having their outer bights respectively embracing the outer pivot rods, said links having transverse swinging and sliding engagement with said pivot rods.

5. The combination with the outer shoe or casing of a tire and a channeled supporting rim between which the beads are received, of a filler for resiliently maintaining the tread portion of the casing normally in concentrically spaced relation to the rim, said filler including a resilient band of a transverse configuration corresponding to the inner tread portion of the shoe or casing and arranged within said portion, a connection between said band and the rim comprising inwardly projecting bearing brackets on the band, parallel circumferential pivot rods carried by the bearing bracket, outwardly projecting bearing members secured to the rim, an annular pivot rod, and substantially semi-circular spring clips interposed between the inner end of each link and engaging the inner faces of the tire beads for forcing the same into engagement with the side flanges of the channeled rim.

CARL ADOLF FISK.